United States Patent
Daniels

(10) Patent No.: US 8,172,233 B2
(45) Date of Patent: May 8, 2012

(54) SEAL WITH INTEGRATED SHROUD FOR ANDROGENOUS DOCKING AND BERTHING IN CONTAMINATED ENVIRONMENTS

(75) Inventor: Christopher C. Daniels, Akron, OH (US)

(73) Assignee: The University of Akron, Akron, OH (US)

( * ) Notice: Subject to any disclaimer, the term of this patent is extended or adjusted under 35 U.S.C. 154(b) by 727 days.

(21) Appl. No.: 11/758,337

(22) Filed: Jun. 5, 2007

(65) Prior Publication Data

US 2008/0001361 A1    Jan. 3, 2008

Related U.S. Application Data

(60) Provisional application No. 60/810,932, filed on Jun. 5, 2006.

(51) Int. Cl.
 *F16J 15/46* (2006.01)
(52) U.S. Cl. .......................................... 277/583; 277/645
(58) Field of Classification Search .................. 277/331, 277/334, 325, 583, 605, 607, 645–646
See application file for complete search history.

(56) References Cited

U.S. PATENT DOCUMENTS

| | | | | |
|---|---|---|---|---|
| 3,940,152 A | * | 2/1976 | Fournier | 277/641 |
| 4,290,612 A | | 9/1981 | Stevens | |
| 4,545,565 A | * | 10/1985 | Sano et al. | 251/331 |
| 5,143,381 A | * | 9/1992 | Temple | 277/314 |
| 6,170,781 B1 | | 1/2001 | Sherrill et al. | |
| 6,431,385 B1 | * | 8/2002 | Palmer | 220/324 |
| 6,485,029 B1 | * | 11/2002 | Moody et al. | 277/642 |
| 6,877,695 B2 | | 4/2005 | Eveker et al. | |
| 6,966,559 B1 | * | 11/2005 | Fischer et al. | 277/635 |

OTHER PUBLICATIONS

Parker Hannifin Corp., Composite Sealing Systems Division, Parker Composite & Metal Seals Meet, Exceed Energy, Oil and Gas Industry . . . No. 5116B1-USA, application bulletin.

* cited by examiner

*Primary Examiner* — Vishal Patel
(74) *Attorney, Agent, or Firm* — Renner, Kenner, Greive, Bobak, Taylor & Weber

(57) ABSTRACT

The present invention is directed to a specially configured seal system which provides a barrier to gas leakage flow between a pressurized module and its external environment. The seal includes a shroud covering which protects the sealing interface from its environment when not in use, and retracts to expose the sealing interface when mated. The seal system is constructed and arranged to mate with a seal of identical construction and arrangement or to mate with a flat surface.

11 Claims, 4 Drawing Sheets

SEAL WITH INTEGRATED SHROUD FOR ANDROGENOUS DOCKING AND BERTHING IN CONTAMINATED ENVIRONMENTS

RELATED APPLICATION DATA

This application claims priority to previously filed U.S. Provisional Patent Application Nos. 60/810,931, filed on Jun. 5, 2006, entitled "Seal with Integrated Shroud for Androgenous Docking and Berthing in Space Environments". The above-identified patent application is hereby incorporated by reference in its entirety.

The present invention was made in the course of research that was supported by National Aeronautics and Space Administration (NASA) Grant NCC04AA73A. The United States government may have certain rights to the invention or inventions herein.

BACKGROUND OF THE INVENTION

Flexibility and adaptability in a space environment is needed to further exploration into space. In addition, the ability to protect seals when not in use is needed for dust environments, debris containing environments, mining applications, petroleum exploration, petroleum refining, petroleum handling, chemical exploration, chemical refining, chemical handling, superconductor manufacturing environments, semiconductor manufacturing environments, combat environments, medical environments, including medical usages within a human body, and underwater environments.

A mechanism being developed to join space vehicles and structures, called the Low Impact Docking System (LIDS) is designed to be the interface between pressurized manned and autonomous modules. The LIDS is designed to overcome the limitations of mechanisms currently in use for the human exploration of space. The systems currently in use, including the Common Berthing Mechanism (CBM) used on the International Space Station, can function either as a docking or berthing mechanism, but not both. (Docking refers to the mating between two free-flying structures or vehicles which are generally crewed. Berthing refers to the joining of two structures typically by using a robotic arm and are generally unmanned autonomous modules.) These current systems are composed of two non-identical halves (a male and a female), limiting their functionality to mating with structures having the opposite gender interface.

A current system used in space development is known as the LIDS system and is designed as an androgynous system, such that each system half is an identical replicate of any other. Any two vehicles or modules each having an LIDS incorporated can mate with the other without regard for gender. During mating, one LIDS system is selected as the active side and the other is selected as the passive side, effectively designating a male and a female in situ. This feature of the LIDS provides an additional layer of fault tolerance, since either half can be designed the active half. The androgynous nature of the LIDS, however, creates challenges for the sealing interface between the two pressurized modules. Since each system half is an exact replicate of its mating counterpart, the gas seals must interact with a replicate (in a seal-on-seal configuration) instead of a more conventional flat surface.

The LIDS can be designed to accommodate NASA's future space exploration missions, such that it must operate in low-Earth-orbit (LEO), in high-Earth orbit, on the lunar surface, and in deep space locations. Therefore, the seal's ability to resist the detrimental effects of space environments is required. Each of these environments offers unique exposures to temperature, solar radiation, reactive elements, debris and mission duration.

Degradation of polymers can occur due to exposure to solar ultraviolet radiation (UV). In the environment of space, the UV is energetic enough to break polymer bonds. Degradation, in the form of scissioning and crosslinking, can modify the material's surface characteristics and cause seal material mass loss. In Earth orbit, the (UV) dissociates oxygen molecules creating monatomic oxygen (AO). Monatomic oxygen is very reactive and aggressively erodes most organic compounds.

Micrometeriods and man-made debris threaten the integrity of all Earth-orbiting and transitory spacecraft The relative speeds at which particles impact the spacecraft (>20,000 miles/hour) can easily damage a sealing surface that needs to achieve a near-hermetic seal.

The Martian surface, as recorded during the Mars Pathfinder mission is also a harsh environment. The atmospheric pressure was below 1% that of the earth (<1 kPa) while the temperature fluctuated 60° C. daily, but never reached above 0° C. The Martian weather included dust-devils and dust settling from the atmosphere. The dust particles contain peroxides that may react with seal materials.

The operating environments of interplanetary missions are non-specific and are assumed to be similar to those of lunar missions. However, the dormancy time (the time during which the seal is exposed on the exterior of the space module, but not mated to another module) would be far longer. Since the travel time to the moon is on the order of days or weeks, the dormancy period would be at most years. Since the travel time to other planets would be years, the expected dormancy period may be decades.

Throughout the dormancy period, the sealing surface must be protected from exposures to temperature, solar radiation, reactive elements, and debris, so that a near-hermetic seal can be formed when the seal is mated with its replicate.

Chemical and petroleum handling, refining and exploration present similar challenges regarding contamination and destruction of sealing surfaces as exposure to air and chemicals used in the process degrade current sealing surfaces. The mining industry presents similar challenges regarding dust contamination. Protection in these environments being key to prevent seal contamination.

Underwater exploration presents challenges similar to the space environment as seal exposure to environmental factors must be minimized in order to preserve the seal integrity prior to its engagement. When coupled with usages such as mining, petroleum exploration and handling and energy exploration and handling, underwater environments present a need in the art for a protection of the sealing surfaces utilized.

SUMMARY OF INVENTION

The present invention is directed to a specially configured seal system which provides a barrier to gas leakage flow between a pressurized module and its external environment. The seal includes a shroud covering which protects the sealing interface from its environment when not in use, and retracts to expose the sealing interface when mated. The seal system is constructed and arranged to mate with a seal of identical construction and arrangement or to mate with a flat surface.

In one embodiment the present invention discloses a seal system able to operate in an engaged position to provide a barrier to gas leakage flow between an internal environment and an external environment and, in a disengaged position, to protect the seal system internal components from the external environment comprising: a sealing surface which can engage a seal, a seal which can engage the sealing surface to provide a barrier to gas leakage flow, and one or more shrouds which enclose and protect the seal when the seal system is disengaged and retract to expose the sealing surface when the seal system is engaged.

DETAILED DESCRIPTION OF THE INVENTION

The present invention is directed to a specially configured seal system which provides a barrier to gas leakage flow between a pressurized module and its external environment. The seal includes a shroud covering which protects the sealing interface from its environment when not in use, and retracts to expose the sealing interface when mated. The seal system is constructed and arranged to mate with a seal of identical construction and arrangement or to mate with a flat surface.

In one embodiment the present invention discloses a seal system able to operate in an engaged position to provide a barrier to gas leakage flow between an internal environment and an external environment and, in a disengaged position, to protect the seal system internal components from the external environment comprising: a sealing surface which can engage a seal, a seal which can engage the sealing surface to provide a barrier to gas leakage flow, and one or more shrouds which enclose and protect the seal when the seal system is disengaged and retract to expose the sealing surface when the seal system is engaged.

The invention discloses a seal system used in the environment of space and/or other potentially contaminating environments. The invention is designed to protect the sealing surface when not in use, and when engaged allowing the sealing surface a brief exposure followed by further protection upon engagement. The operating temperatures for the invention are in the range of −50 to 50° C. (or −148 to +212° F.), however these temperature ranges are a guideline and can be as much as −100 to 100° C., or even as much as −250 to 400° C. Therefore the material from which the seal system is manufactured comprises a glass transition temperature below the expected minimum operating temperature in order to retain elasticity during operation. The seal material is also stable above its maximum operating temperature. Additionally, in one embodiment, the seal material is characterized as low outgassing, per ASTM E595, having percent total mass loss (THL %) less than 1.0% and collected volatile condensable materials (CVCM %) less than 0.1%. Examples of environments where the invention can be utilized include but are not limited to space environments, dust containing environments, debris containing environments, mining applications, petroleum exploration, petroleum refining, petroleum refining, chemical exploration, chemical refining, chemical handling, superconductor handling, superconductor manufacturing, semiconductor handling, semiconductor manufacturing, war/combat environments, medical environments, including medical usages within a human body, and underwater environments.

Figure 1:
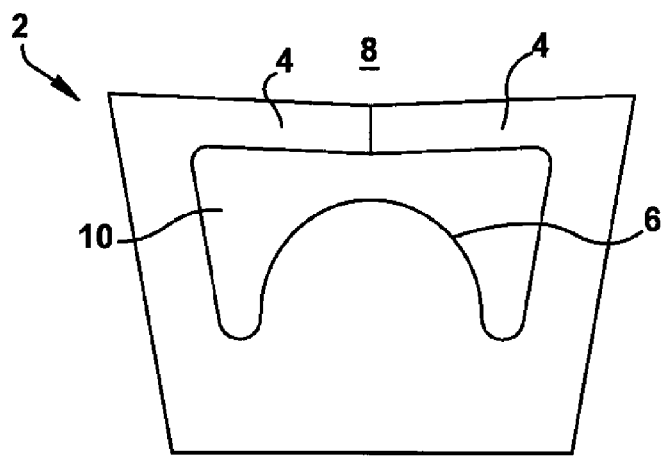
FIG. 1 is a cross sectional drawing of one embodiment of an undistorted seal system.

Seal system 2 consists of a shroud 4 and a sealing surface 6 as shown in FIG. 1. FIG. 1 detailing a cross section of an undistorted seal system 2. In FIG. 1, shroud 4 is shown as L-shaped, but can be C-shaped or any geometric shape which allows movement upon seal system 2 engagement. When seal system 2 is not engaged with another sealing surface, shroud 4 covers sealing surface 6. Shroud 4 effectively protects sealing surface 6 from exposure to environment 8, such environments including solar radiation, reactive elements, debris, space dust and any detrimental objects or elements present in a space, underwater, underground, mining and/or other terrestrial environments. In undistorted form seal system 2 contains a void space 10 which protects sealing surface 6 from harmful exposure such as environment 8 or other factors. Void space 10 may contain air, a vacuum or any other suitable material which would not impact negatively upon sealing surface 6.

The composition of seal system 2 being made from, but not limited to an elastomeric material such as polymer, rubber, plastic or any other material, including metal, pliable enough to flex into the necessary shapes yet still retain the required rigidity. Other exemplary materials for the shroud, sealing surface or seal include rubber, polymer, plastic, metals, ceramics, intermetallics, composites, filler, nanofiber, nanotube, antioxidants, antiozonants and/or any combination thereof. Examples of elastomers, rubber or polymers include, but are not limited to acrylonitrile-butadiene, carboxylated nitrile, ethylene acrylate, ethylene propylene rubber, butyl rubber, butadiene rubber, chlorobutyl rubber, chloroprene rubber, chlorosulfonated polyethylene, epichlorohydrin, fluorocarbon, fluorosilicone, hydrogenated nitrile, perfluoroelastomer, polyacrylate, polyurethane, silicone rubber, styrene-butadiene, and tetrafluoroethylene-propylene. Examples of metals include, but are not limited to, stainless steels, steels, nickel-based superalloys, indium, gallium, copper, nickel, gold, silver, aluminum, titanium, and brass.

Another necessary characteristic of the material used for seal system 2 involves compatibility with a space or a dust containing environment. Material used in shroud 4 area are designed, formulated or compounded to withstand long exposure to the harsh environment 8 of space applications, underwater environments and/or harsh dust/debris environments. Such exposure could be on the order of at least one month, at least one year or even at least 50 years. Material used in sealing surface area 6 need only be able to withstand shorter exposures to such environment 8 as the exposure of environment 8 to sealing surface 6 is typically only long enough to fully engage seal system 2.

Seal system 2 is typically attached to a vehicle, module, or similar apparatus and allows connections of said vehicle, module, or similar apparatus with another item. For example, in one embodiment seal system 2 allows two spacecraft the ability to connect with one another. In order to facilitate this connection, seal system 2 is affixed either permanently or temporarily by an attachment means to the vehicle, module, spacecraft or similar apparatus. The mechanical properties disclosed herein then allow the vehicle, module, spacecraft or similar apparatus to connect to other vehicles, modules, or similar apparatus for both short and long periods of time. Such terms maybe for a few minutes up to 50+ years.

Figure 2:
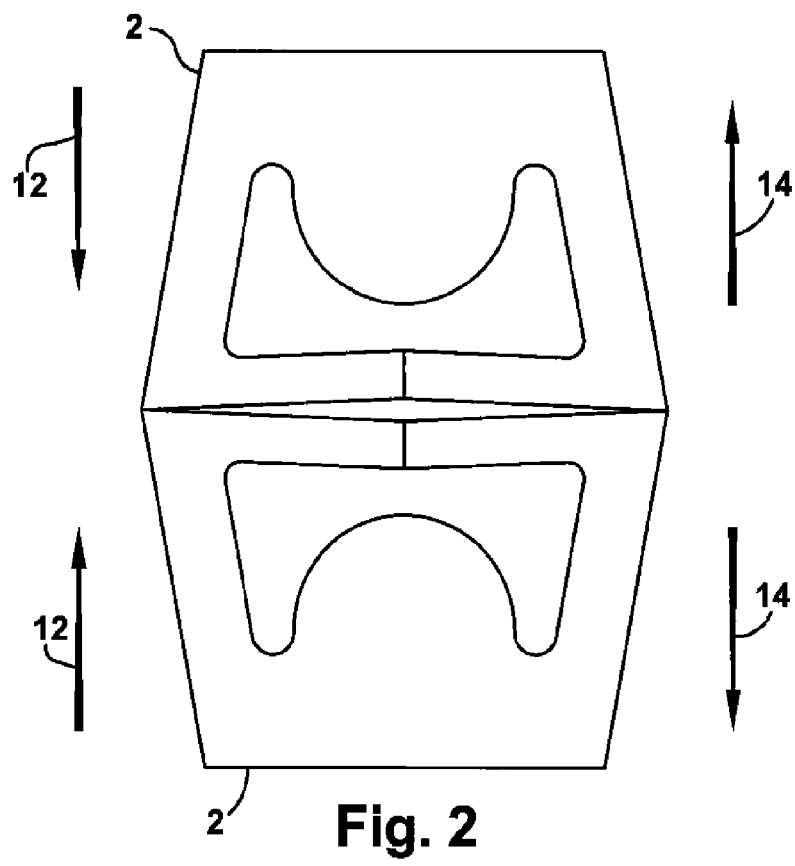
FIG. 2 is a cross sectional drawing of two mating seals at time of initial contact.

Upon interfacing with another replicate seal, the shroud of each seal system 2 contacts the other as shown in FIG. 2. In some embodiments, both seals would be identical, however seal system 2 can interface with other seal types, with seals of varying/different sizes or with a rigid surface and still achieve its stated purpose. The two seals/seal systems engage by moving in a direction towards 12 one another. The seals disengage by moving in a direction away 14 from one another. In a setup where only one seal system is used, the same direction of motion are employed, with the seal moving in a direction towards the object to engage and away from the object to disengage.

Figure 3:
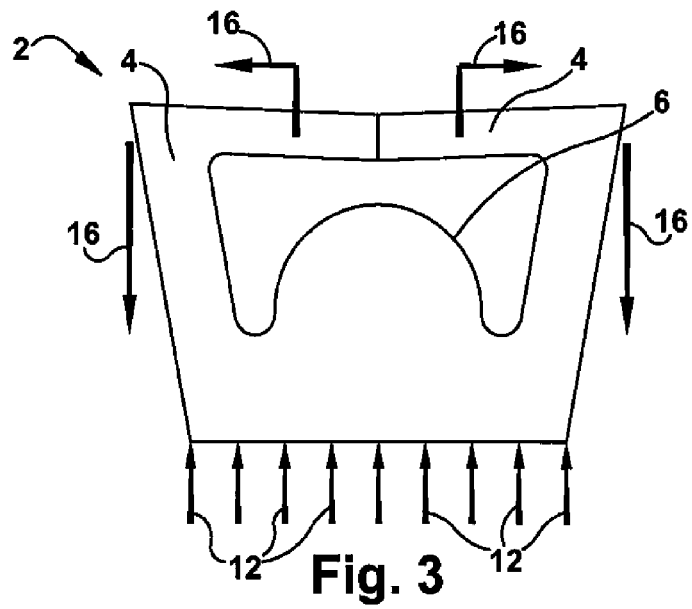
FIG. 3 is a free body diagram of a seal system at time of initial contact.

Regarding the movement of seal system 2 toward contacting surface 12, due to the moment created between the shroud contact force and the seal retainer reaction force, shroud 4 moves outward away 16 from sealing surface 6 (see FIG. 3) when force toward the contacting area is applied. Once shroud 4 moves away, sealing surface 6 itself is available for contact. FIG. 3 details shroud 4 moving in a rotational direction about an axis of rotation. Shrouds 4 move in a direction away 16 from the sealing surface. In essence one shroud moves clockwise and one shroud counterclockwise, with both shrouds moving in a rotational direction opposite and away from the other shroud. These movements 16 are due to the creation of the moments via geometrical design of the seal system 2. When seal system 2 is moved in a direction toward contacting surface 12, these moments are created when force is applied toward the contacting area. In another embodiment the direction toward contacting surface 12 enables shrouds 4 to collapse into the seal system 2 and allows for full exposure of sealing surface 6. In yet another embodiment the shroud rotation about an axis and the shroud collapsing movement are combined to allow shroud 4 to both collapse and rotate while exposing sealing surface 6.

Figure 4:
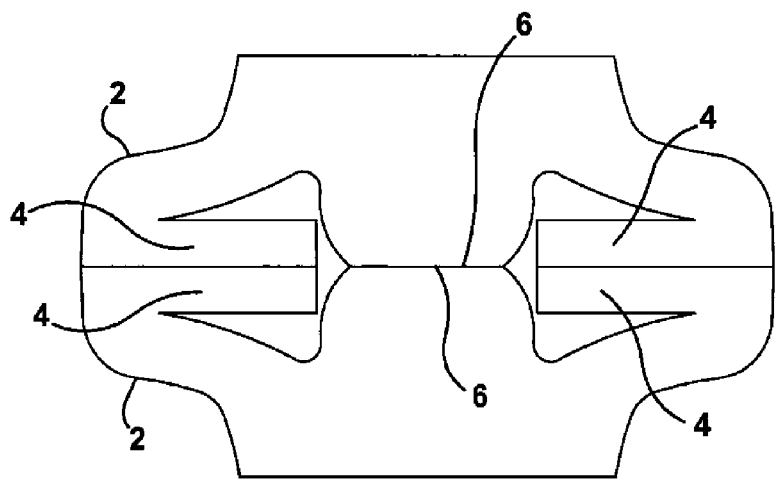
FIG. 4 is a cross sectional drawing of one embodiment of two fully compressed seals.

The motion of seal system 2 mating with either another seal or a rigid surface compresses and mechanically distorts the seal until the seal is fully compressed (see FIG. 4). The shrouds 4 from each of the opposing seals move outward, such that the opposing sealing surfaces 6 have contacted to produce a near-hermetic seal. Since sealing surfaces 6 have not been exposed to the harsh external environment, the material composition remains in its optimum state.

Seal system 2, when properly aligned, is near-hermetic in nature. That is, it does not allow gas to leak past seal system 2 when a pressure differential is applied across the seal (see FIG. 4). Seal system 2, when misaligned with another seal, limits the leakage flow past seals to an acceptable level. The nature of seal system 2 cross section accommodates axial and angular misalignments of the mating structures, while maintaining an effective seal/bond. In addition when seal system 2 is misaligned a complete engagement of seal is not necessary as seal still forms an effective bond when not fully compressed.

In addition to axial misalignments, angular misalignments and incomplete engagements, seal system 2 can form an effective seal if utilized in conjunction with a seal of a different size. Different sized seals and/or seals of different geometries can still effectively bond/mate/seal to form a proper barrier. The invention is also not limited by temperature, as seals 2 operating at varied temperatures are able to bond/mate/sea with one another.

Figure 5:
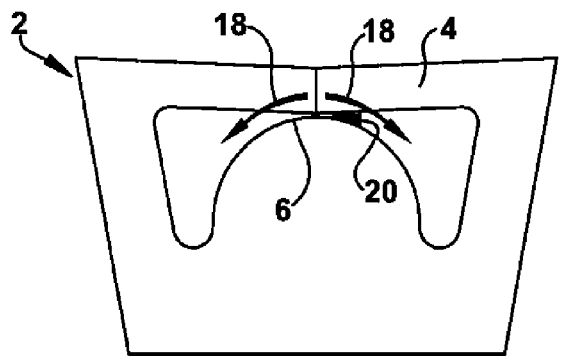
FIG. 5 is a drawing showing the shroud removing dust and debris from the sealing surface.
Figure 6:
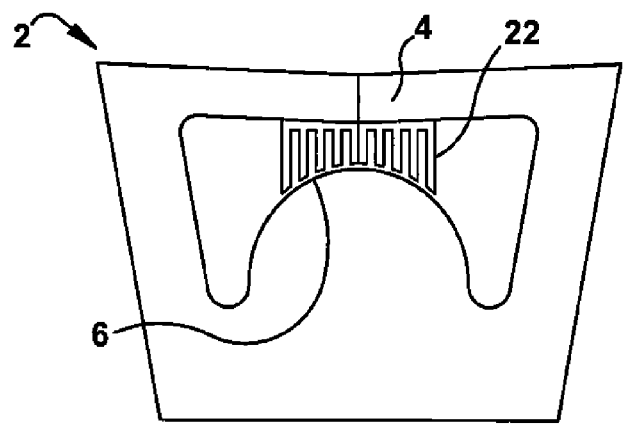
FIG. 6 is a cross sectional drawing of a seal system showing added features to improve removal of dust and debris that contaminate the sealing surface.

Shroud 4 may be constructed in such a manner as to remove dust and debris from sealing surface 6 should the sealing surface become contaminated. In one embodiment clearance 20 between shroud 4 and sealing surface 6 can be designed, along with the composition and dimensions of the seal/shroud, to move in close proximity, or even touching, so as to remove dust and debris from the sealing surface (see FIG. 5). The sweeping action of shroud 4 laterally across sealing surface 6 provides a means to remove dust and debris from the sealing surface should it be contaminated. This sweeping motion 18 on sealing surface 6 removes any contaminants present. In another embodiment a cleaning mechanism 22 may also be added to shroud 4 to aid in the removal of dust, debris or contamination from sealing surface 6 (see FIG. 6). A device such as, but not limited to, one or more brushes, one or more plates, one or more wires or any other appropriate apparatus effectively cleans sealing surface 6. In another embodiment, electrically charged materials are utilized to repel particles of opposite electrical charge from shroud 4 and/or sealing surface 6. In still another embodiment an electrical conductor is embedded into shroud 4 and/or sealing surface 6 to accomplish same.

Figure 7:
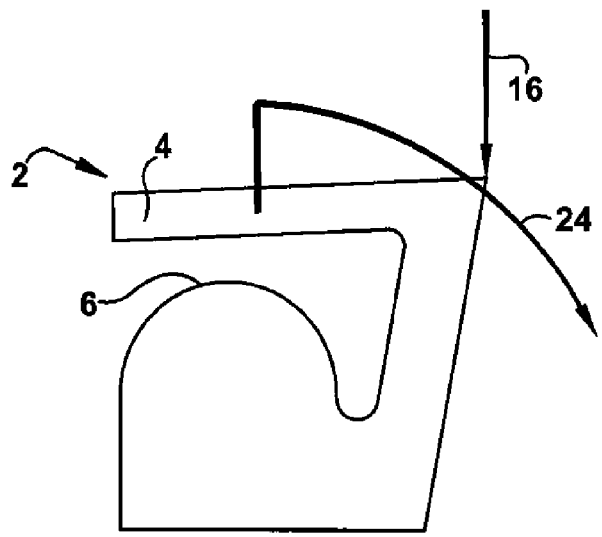
FIG. 7 is an drawing showing an alternate shroud and seal configuration utilizing in this embodiment a single shroud.

Various embodiments may be employed for the movement of shroud 4. Shroud 4 may be constructed such that two covers separate to expose the sealing surface (see FIG. 3). In another embodiment, shroud 4 may be constructed such that sealing surface 6 is exposed by moving in one direction 24 (see FIG. 7). The invention is not limited to a single path for the shroud, as any number of paths may be designated for the movement of the shroud, and allowing for engagement of the sealing surface.

Figure 8:
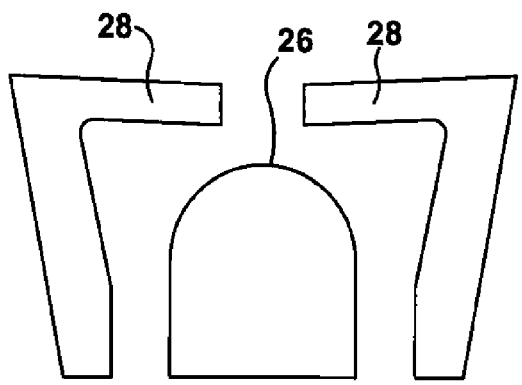
FIG. 8 is an exploded cross sectional drawing showing how the shroud and seal may be separated or constructed as separate parts.

In another embodiment the seal and shroud are constructed from two or more separate pieces. The seal and shroud are constructed as a separate sealing surface 26 and separate shroud 28 (see FIG. 8). In this embodiment separate shroud 28 and separate sealing surface 26 are individually and separately attached to the vehicle/component.

Figure 9:
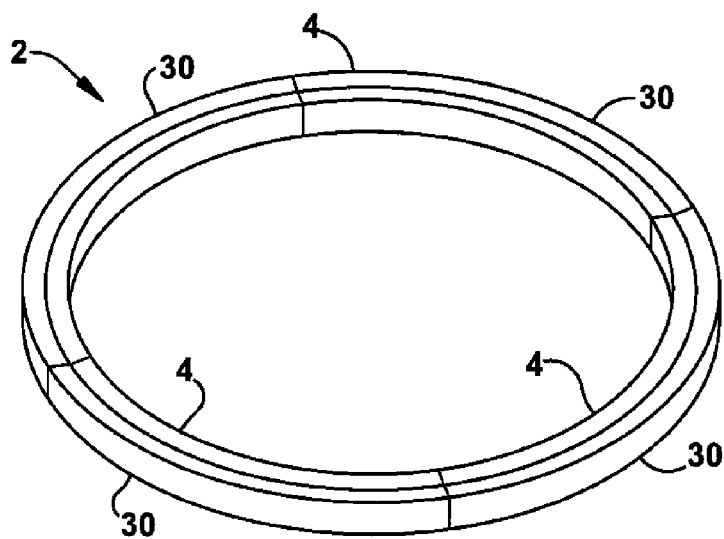
FIG. 9 is a drawing showing an alternate configuration of a seal formed in multiple segments.

In still another embodiment the seal system is constructed as one or more segments. One example of such an embodiment details the seal system constructed as arc segments 30. FIG. 9 details the seal system as a three dimensional circular setup, disengaged, and ready to mate to an appropriate surface. Segmented construction produces a more economical seal as cost is reduced with a segmented seal. Another advantage to segmented seals includes seal systems damaged while in use, as replacement of a single segment in harsh environments is much easier than replacement of an entire seal system. In addition the bulkiness of the seal versus a segmented seal offers easier storage and manageability for segmented seals. In determining between a segmented and continuous seal these factors must be weighed against the increased potential for leakage via the segmented seal gaps.

The seal system may be constructed such that the seal and shroud are made of the same material composition. In another embodiment the seal and shroud are made of different material compositions. In one embodiment the seal is made from a combination metal and elastomeric composition. In this example sealing surface 6 is made from an elastomeric substance, while shroud 4 is made from a metal. The metal being thin enough to allow for flexibility of shroud 4. Various combination of this nature are possible, each employing different compositional arrangements.

Figure 10:
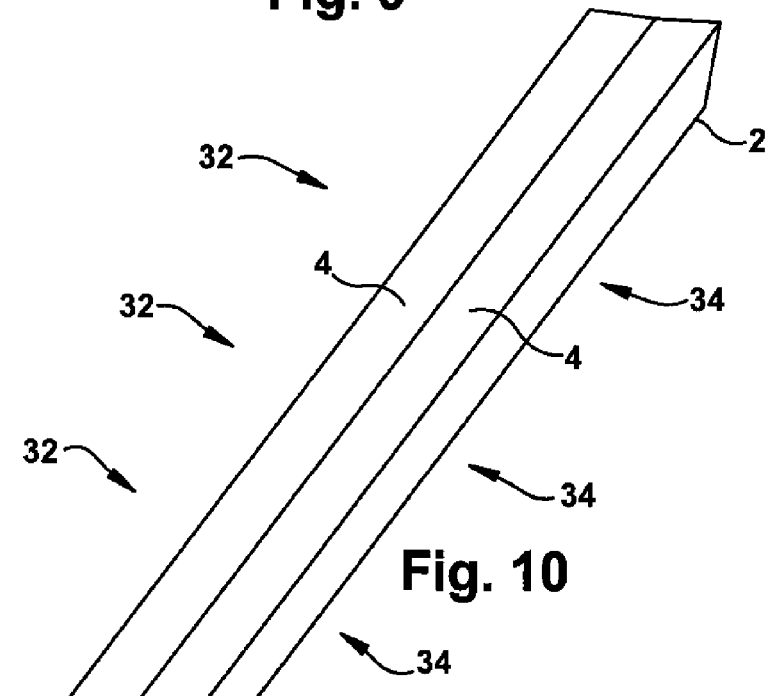
FIG. 10 is a drawing of the linear seal configuration.

FIG. 10 details in 3-dimensions seal system 2 in a linear setup. In one embodiment seal system 2 becomes engaged and allows a separation between a low pressure environment 32 and a high pressure environment 34.

The cross section of seal system 2 allows mating and hermetic sealing of the seal with both (1) another seal of identical construction and arrangement, (2) another seal of a different construction, (3) a flat surface, (4) any rigid surface.

Figure 11:
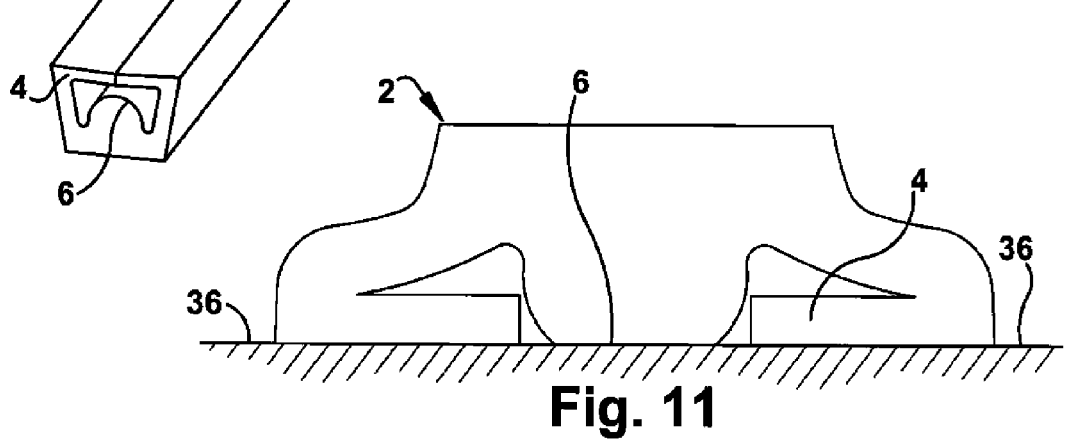
FIG. 11 is a drawing of one embodiment of the seal against a flat surface.

FIG. 11 details seal system 2 engaged against a flat surface 36. As stated previous seal system 2 can be utilized versus another seal or a flat/rigid surface 36 such as a wall or the side of another vehicle/apparatus.

The cross section of the seal accommodates axial, and angular misalignments while maintaining an effective seal/bond. The application of this invention is novel in that it allows mating with another seal and therefore, seals generally do not have to be axially aligned.

The cross-section of seal system 2 provides a protective coating for sealing surface 6. This shroud 4 retracts when the seal engages the mating surface. Current seal technology require an additional shroud mechanism to protect the sealing surface from the external environment, in this manner such a shroud would be similar to placing a cover over the seal. The cover serving to protect the sealing surface from the external environment. Previously utilized covers were manually removed either by human hands, a robotic arm or a mechanism such as a motorized hinge. The only other option to protect these seals was to keep the seals inside a vehicle, such as the Space Shuttle, until their required use. The present invention allows the seal to remain in its intended place/position and easily activates the sealing surface by moving the shroud aside. The seal remains protected until used.

The material composition of the sealing surface is compatible with space environments and/or high dust containing environments only for brief periods of time when the shroud exposes the sealing surface. (The composition of current sealing surfaces is needed to be compatible with space environments for long periods of time if left unshrouded.) As before the sealing surface remains protected until engagement.

In one embodiment the elastomeric composition of the seal provides a near-hermetic seal under nominal and off-nominal conditions.

In embodiments where elastomeric composition are used for the seal, the seal allows for custom coatings of the shroud and sealing surfaces to improve leakage characteristics, degradation resistance, adhesion characteristics, and dust/debris repulsion. In one embodiment the seal is composed from silicone rubber to provide resistance to the exposure in space environments. Silicone rubber as used provides an operating temperature down to at least −100° C. (and lower depending on the composition used). In addition the seal must resist breakdown at higher temperatures. In this embodiment the silicon rubber able to withstand heat as high as 100° C. Additional embodiments allow for a range up to −250 to 400° C., based on the materials utilized in the seal.

Other embodiments utilize different compounds/components to combat the exposure problems associated with various environments. One embodiment utilizes coatings to alter adhesion properties as the adhesive force between the sealing surface and the item bonded to cannot be too high so as to result in excessive energy being required to overcome the adhesive properties of sealing surface 6. An example of such a coating includes but is not limited to $SiO_x$ type coatings such as $SiO_2$, $SiO_3$ and/or $SiO_4$. An $SiO_x$ coating will produce all 3 depending upon the coating and the reactivity of the underlying substrate.

Ultraviolet radiation coatings are an option to improve radiation resistance. In another embodiment electrostatic coatings are applied to charge the seal with an opposite charge from the potential dust/debris and repels the contaminants. One embodiment of UV coatings including the hydroxyphenyl-benzotrialoe classes of coatings. Electrical charges are used to repel particles of an opposite electrical charge. In one embodiment an electrical connector is embedded into the seal itself. The electrical connector is then charged to repel any dust/contaminants.

The cross-section of the seal system and ability of the seal to remain protected facilitates a space module being dormant for long durations before producing a hermetic seal when mating with another module. The elastomeric composition of the seal makes possible two space modules, or any other setup used, being connected for long durations without seal degradation as the seal surface remains protected from harsh environments.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

I claim:

1. A seal system comprising:
   a seal body having a base from which extends a semi-circular sealing surface that is configured to engage a contact surface; and
   a first and second shroud portion extending from the seal body, each shroud portion having an end, such that the semi-circular sealing surface is disposed within a void defined by the shroud portions and the base, wherein the end of each of the first and second shroud portions are positioned in contact with each other, so as to cover the semi-circular sealing surface;
   wherein the void includes an interior gap disposed between the shroud portions and the semicircular sealing surface;
   whereby, when the sealing surface is forced toward the first and second shroud portions, the ends of the first and second shroud portions retract to form a gap, thereby forcing the semi-circular sealing surface to extend through the gap to engage the contact surface.

2. The seal system of claim 1, wherein the void is enclosed.

3. The seal system of claim 2, wherein the void is pressurized.

4. The seal system of claim 1, wherein the sealing surface and the first and second shroud portions are made from elastomeric materials.

5. The seal system of claim 1, wherein the seal body is constructed from one continuous component.

6. The seal system of claim 1, wherein the seal body is constructed from two or more components.

7. The seal system of claim 1, wherein the first and second shroud portions are L-shaped.

8. The seal system of claim 1, wherein the sealing surface is made from one or more rubbers, polymers, plastics, metals, ceramics, intermetallics, composites, fillers, nanofibers, nanotubes, antioxidants, antiozonants and/or any combination thereof.

9. The seal system of claim 8, wherein the glass transition temperature of the one or more rubbers, polymers, plastics, metals, ceramics, intermetallics, composites, fillers, nanofibers, nanotubes, antioxidants, antiozonants and/or any combination thereof is less than −100° C.

10. The seal system of claim 1, wherein the first and second shroud portions are made from one or more rubbers, polymers, plastics, metals, ceramics, intermetallics, composites, fillers, nanofibers, nanotubes, antioxidants, antiozonants and/or any combination thereof.

11. The seal system of claim 10, wherein the glass transition temperature of one or more rubbers, polymers, plastics, metals, ceramics, intermetallics, composites, fillers, nanofibers, nanotubes, antioxidants, antiozonants and/or any combination thereof is less than −100° C.

* * * * *